United States Patent [19]

Tanaka et al.

[11] Patent Number: 4,887,202
[45] Date of Patent: Dec. 12, 1989

[54] INPUT-OUTPUT CONTROL METHOD IN A VIRTUAL MACHINE SYSTEM

[75] Inventors: Shunji Tanaka, Machida; Hidenori Umeno, Kanagawa, both of Japan

[73] Assignee: Hitachi, Ltd., Tokyo, Japan

[21] Appl. No.: 890,524

[22] Filed: Jul. 30, 1986

[30] Foreign Application Priority Data

Jul. 31, 1985 [JP] Japan .................. 60-170430

[51] Int. Cl.$^4$ .................. G06F 9/10; G06F 4/00
[52] U.S. Cl. .................. 364/200
[58] Field of Search ... 364/200 MS File, 900 MS File

[56] References Cited

U.S. PATENT DOCUMENTS

| | | | |
|---|---|---|---|
| 4,456,954 | 6/1984 | Bullions, III et al. | 364/200 |
| 4,494,189 | 1/1985 | Bean et al. | 364/200 |
| 4,533,996 | 8/1985 | Hartung et al. | 364/200 |
| 4,571,674 | 2/1986 | Hartung | 364/200 |
| 4,674,038 | 6/1987 | Brelsford et al. | 371/16 |
| 4,802,084 | 1/1989 | Ikegaya et al. | 364/200 |
| 4,814,975 | 3/1989 | Hirosawa et al. | 364/200 |

FOREIGN PATENT DOCUMENTS

| | | |
|---|---|---|
| 60-79434 | 5/1985 | Japan . |
| 60-14429 | 7/1985 | Japan . |
| 60-159948 | 8/1985 | Japan . |
| 60-225944 | 11/1985 | Japan . |

Primary Examiner—Gareth D. Shaw
Assistant Examiner—Viet Nguyen
Attorney, Agent, or Firm—Antonelli, Terry & Wands

[57] ABSTRACT

An I/O control system in a virtual machine system has at least one virtual machine (VM) running under control of a virtual machine control program (VMCP) and has a direct I/O execution mode in which an I/O interruption to the I/O device dedicated by the running VM is directly executed without intervention of the VMCP and an indirect I/O execution mode in which the I/O interruption is simulated. The I/O control system comprises identification portion for identifying the I/O device requesting the switching to the direct I/O execution mode, judge portion for judging a mode switching condition and mode selection portion for selecting one of the two modes. If the VM which contemplates the direct execution has not yet dedicated the I/O device requesting the mode switching, it dedicates the I/O device, and if the VM has not yet dedicated an I/O interrupt subclass which controls the I/O interruption of the I/O device, it dedicates the subclass, and the I/O device in the indirect I/O execution mode is switched to the direct I/O execution mode.

10 Claims, 10 Drawing Sheets

| MODE BIT | ARCHITEC-TURE IDENTIFI-CATION NUMBER | o ~ o | I/O DEVICE NUMBER |
|---|---|---|---|
| | VM NUMBER | o ~ o | |

FIG. 10

INPUT-OUTPUT CONTROL METHOD IN A VIRTUAL MACHINE SYSTEM

BACKGROUND OF THE INVENTION

The present invention relates to an input/output control system in a virtual machine system (VMS), and more particularly to an input/output control system in the VMS which allows hardware to directly execute an input/output instruction from an OS on a virtual machine (VM) and a related input/output interruption without intervention of a virtual machine control program (VMCP).

Figure 10:
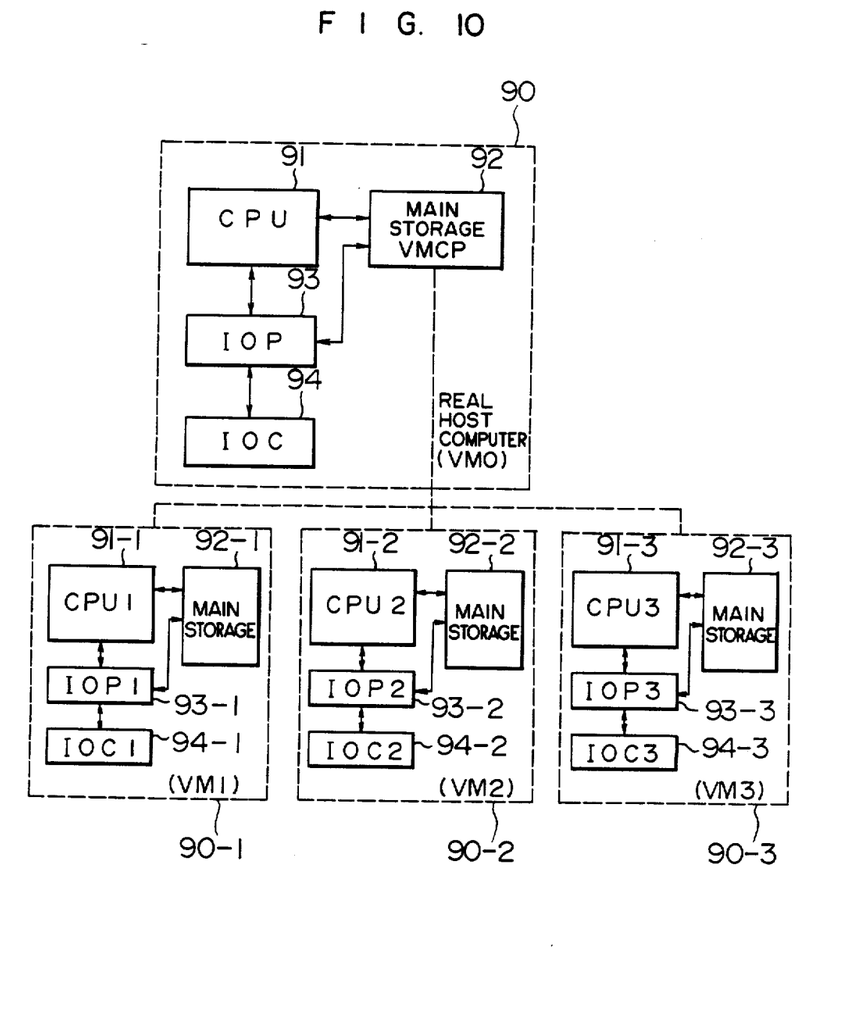
FIG. 10 shows a configuration of a conventional virtual machine system.

The virtual machine system (VMS) has the same hardware configuration (a central processing unit, a main storage and input/output devices) as that of a real host computer but the virtual machine control program (VMCP) is loaded on the main storage so that a plurality of logical machines (which are hereinafter referred to as virtual machines (VM's) are logically configured by a hardware simulation function of the VMCP to perform various processings. FIG. 10 shows a configuration of the virtual machine system. In FIG. 10, numeral 90 denotes a real host computer, numeral 91 denotes a central processing unit (CPU), numeral 92 denotes a main storage having a VMCP loaded therein, numeral 93 denotes an I/O processor, numeral 94 denotes an I/O control unit and numerals 90-1, 90-2 and 90-3 denote virtual machines (VM's) logically configured by the VMCP. The VM 90-1 comprises a CPU 91-1, a main storage 92-1, an I/O processor 93-1 and an I/O control unit 94-1. Similarly, the VM 90-2 comprises a CPU 91-2, a main storage 92-2, an I/O processor 93-2 and an I/O control unit 94-2. The VM 90-3 comprises a CPU 91-3, a main storage 92-3, an I/O processor 93-3 and an I/O control unit 94-3. While three virtual machines are configured in FIG. 10, more than three virtual machines may be configured by the VMCP. Each of the VM 90-1, VM 90-2 and VM 90-3 is logically constructed to have the essentially same hardware configuration as that of the real host computer (hereinafter referred to as a host system). An operating system OS which controls and operates the VM resides in the main storage 92-i (i=1, 2, 3) of each VM, and the plurality of OS's concurrently run under one host system. The hardware configuration (CPU, main storage, I/O devices and I/O control unit) in each VM of FIG. 10 is logically constructed by the VMCP and a substantial portion thereof is present on the hardware configuration corresponding to the host system. For example, the main storage of the VM may occupy a portion of the main storage 92 of the host system or may share it. The I/O device of the VM may share the I/O devices of the host system with other VM's or may occupy some of them. In a certain case, there is no corresponding I/O device on the host system but it is virtually constructed by the VMCP. In any case, the OS on the main storage 92-i (i=1, 2, 3) of each VM can see essentially the same hardware configuration (CPU, main storage, I/O processor and I/O control unit) as that of the host system.

In such a virtual machine system, the VMCP will always intervene when an I/O instruction of the OS on the VM is executed. Accordingly, a simulation therefor is necessary and the simulation overhead of the VMCP is large when the frequency of I/O instruction execution is high. In order to reduce the overhead due to the simulation of the I/O instruction from the VM, the inventors of the present invention have proposed "I/O Execution System in a Virtual Machine System" in which the I/O instruction from the VM is directly executed by the hardware without intervention of the VMCP (Japanese Patent Application No. 59-5587, filed on Jan. 18, 1984; U.S. application Ser. No. 691,909 filed on Jan. 16, 1985; EP application Ser. No. 85100372.3 filed on Jan. 16, 1985 and PRC application Ser. No. 85101171 filed on Apr. 1, 1985.). In the proposed system, however, switching between the direct execution mode and a mode in which the simulation is effected by the VMCP, without stopping the VM during its run, is not attained.

SUMMARY OF THE INVENTION

It is an object of the present invention to provide an I/O control system in a virtual machine system which allows switching, during the VM run, between a direct I/O execution mode in which hardware directly executes an I/O instruction to an I/O device dedicated by the VM and a related I/O interruption, without the intervention of the VMCP, and an indirect I/O execution mode (I/O simulation mode) in which the simulation is made by the intervention of the VMCP.

In order to achieve the above object, the virtual machine system of the present invention has the direct I/O execution mode in which the I/O instruction from the operating system (OS) on the VM to the I/O device dedicated by the VM during the VM run under the control of the virtual machine control program (VMCP) and the related I/O interruption are directly executed without intervention of the VMCP, and the indirect I/O execution mode in which the VMCP simulates the I/O instruction from the OS and the related I/O interruption, and comprises identification means for identifying an I/O device which requests switching to the direct I/O execution mode switching condition, and mode selection means for selecting one of those two modes. The identification means identifies the I/O device which requests the switching to the direct I/O execution mode, and if the VM which contemplates the direct execution has not yet dedicated the I/O device which requested the mode switching when the identified I/O device meets the mode switching condition as judged by the judge means, it dedicates that I/O device, and if the VM has not yet dedicated an I/O interrupt subclass which controls the I/O interruption of that I/O device, it dedicates that I/O interrupt subclass, and it switches the mode of that I/O device by the mode selection means from the indirect I/O execution mode to the direct I/O execution mode.

DESCRIPTION OF THE PREFERRED EMBODIMENTS

One embodiment of the present invention is now explained with reference to the drawings.

A principle of the present invention is first explained.

The present invention comprises I/O execution mode control from an indirect I/O execution mode (I/O simulation mode) to a direct I/O execution mode, and I/O execution mode control from the direct I/O execution mode to the indirect I/O execution mode. In the I/O device which is in the direct I/O execution mode, the I/O control is performed by the OS which is dedicated to that I/O device and the VMCP does not intervene. On the other hand, in the I/O device which is in the indirect I/O execution mode, the execution of the I/O instruction from the OS and the reflection of the related I/O interruption to the OS are performed by the intervention of the VMCP.

Thus, when the mode is to be switched from the indirect I/O execution mode to the direct I/O execution mode, the VMCP checks whether or not the I/O control may be shifted or transferred to the OS alone. If the mode switching condition is met, the direct I/O execution mode is set into a flag field in main storage so as to indicate an execution mode of the I/O device.

The switching from the direct I/O execution mode to the indirect I/O execution mode may be performed in one of the following three methods.

In a first method, when the switching to the indirect I/O execution mode is requested, the means for setting the execution mode releases the direct I/O execution mode. Hardware information of the I/O device is read into the VMCP by an instruction to examine the status of the I/O device and the VMCP performs simulation based on that information.

In a second method, when the switching to the indirect I/O mode is requested, the means for setting the execution mode releases the direct I/O execution mode. A request for execution of the I/O instruction to the I/O device initiates a forcible suspension of execution of the I/O instruction. After I/O termination of the I/O device has been detected by the instruction to examine the status of the I/O device, the forcible suspension of the I/O instruction execution request by the VMCP is released and the indirect I/O execution mode is restored.

In a third method, when the switching to the I/O simulation mode is requested, the means for setting the execution mode releases the direct I/O execution mode. The request for execution of the I/O instruction to the I/O device starts the forcible suspension by the VMCP. After a predetermined period, the forcible suspension (pending state) of the I/O instruction execution request by the VMCP is released. The hardware information of the I/O device having the switching request is read into the VMCP by the instruction to examine the status of the I/O device, and the VMCP performs the I/O simulation based on that information. The above methods are specifically explained with reference to the drawings.

FIG. 1 shows a mode switching flow chart for switching the I/O device between the indirect I/O execution mode and the direct I/O execution mode. An outline of the mode switching is explained with reference to FIG. 1 and the detail of the mode switching will be explained with reference to FIG. 2, etc.

Figure 1A:
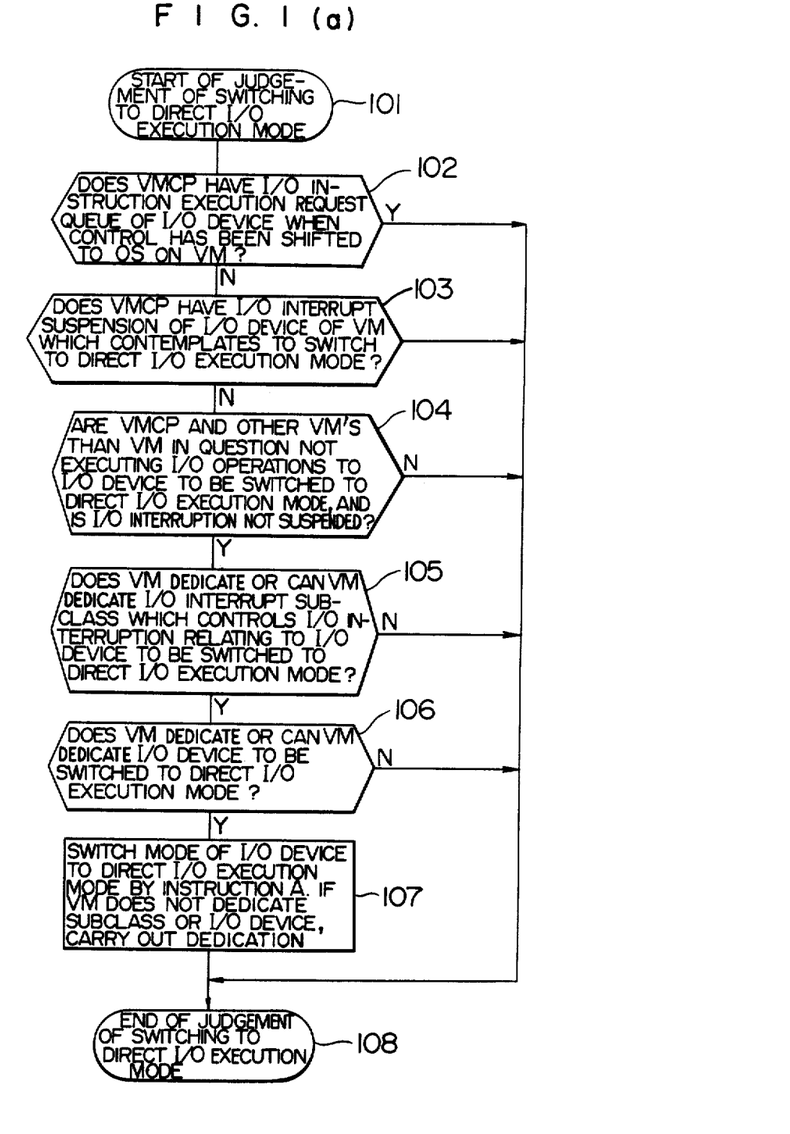
FIGS. 1a–1d show a process flow chart of mode switching in the present invention.

FIG. 1(a) shows a flow chart for switching the mode of the I/O device from the indirect I/O execution mode to the direct I/O execution mode.

Judgement of switching to the direct I/O execution mode is started (step 101). After the control has been shifted to the OS on the VM, the VMCP examines whether it has an I/O instruction execution request queue of the I/O device or not (step 102). If it does not have the queue, the VMCP checks if it has I/O interruption suspension of the I/O device of the VM which contemplate to switch to the direct I/O execution mode or not (step 103). If it does not have the suspension, whether the VMCP and other VM's than the VM in question are not executing I/O operations to the I/O device which is to be switched to the direct I/O execution mode and the I/O interruption is not suspended is checked (step 104). If the I/O interruption is not suspended, whether the VM dedicates an I/O interrupt subclass for controlling the I/O interruption relating to the I/O device which is to be switched to the direct I/O execution mode or not, or whether it can dedicate or not is checked (step 105). If the VM dedicates or can dedicate it, whether the VM dedicates or can dedicate the I/O device which is to be switched to the direct I/O execution mode or not is checked (step 106). If the VM dedicates or can dedicate it, the mode of the I/O device is switched to the direct I/O execution mode by an instruction A (see FIG. 9). If the VM does not dedicate the subclass or the I/O device, it performs an dedication process (step 107). Thus, the judgement of switching to the direct I/O execution mode is terminated (step 108), and when all of the above mode switching conditions are met, the mode of the I/O device is switched from the indirect I/O execution mode to the direct I/O execution mode.

Figure 1B:
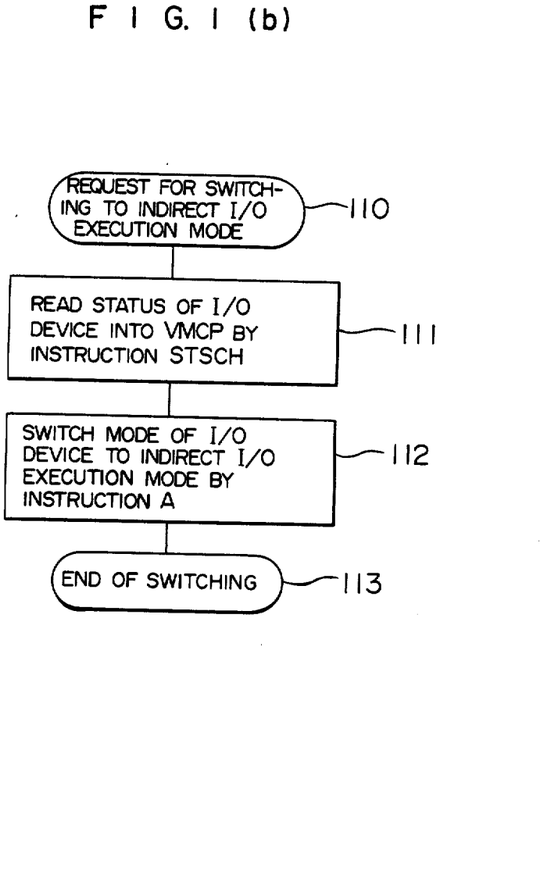

FIG. 1(b) shows a flow chart for switching the mode of the I/O device from the direct I/O execution mode to the indirect I/O execution mode.

When the switching to the indirect I/O simulation mode is requested (step 110), a status of the I/O device is read into the VMCP by an instruction STSCH (step 111). Then, the mode of the I/O device is switched to the indirect I/O execution mode by the instruction A (see FIG. 9) (step 112). Thus, the switching process is terminated (step 113).

Figure 1C:
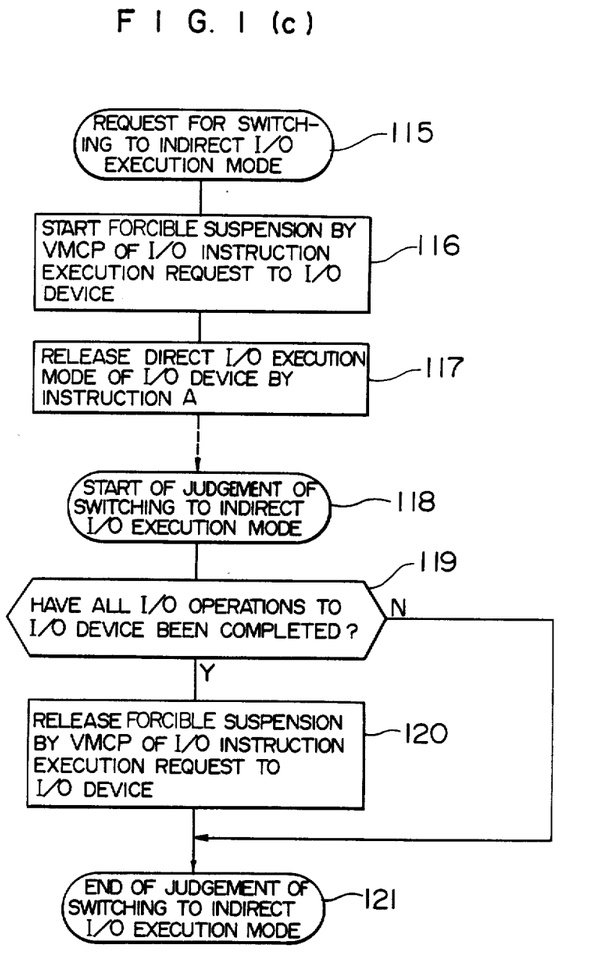

FIG. 1(c) shows another flow chart for switching the mode of the I/O device from the direct I/O execution mode to the indirect I/O execution mode.

When the switching to the, indirect I/O simulation mode is requested (step 115), forcible suspension by the VMCP of the I/O instruction execution request to the I/O device is started (step 116). Then, the direct I/O execution mode of the I/O device is released by the instruction A (see FIG. 9) (step 117). Thereafter, the judgement of switching to the indirect I/O execution mode is started (step 118). First, whether all I/O operations to the I/O device have been completed or not is checked (step 119). If they have been completed, the forcible suspension by the VMCP of the I/O instruction execution request to the I/O device is released (step 120). Thus, the judgement of switching to the indirect I/O simulation mode is terminated (step 121) and the mode of the I/O device is switched from the direct I/O execution mode to the indirect I/O execution mode.

Figure 1D:
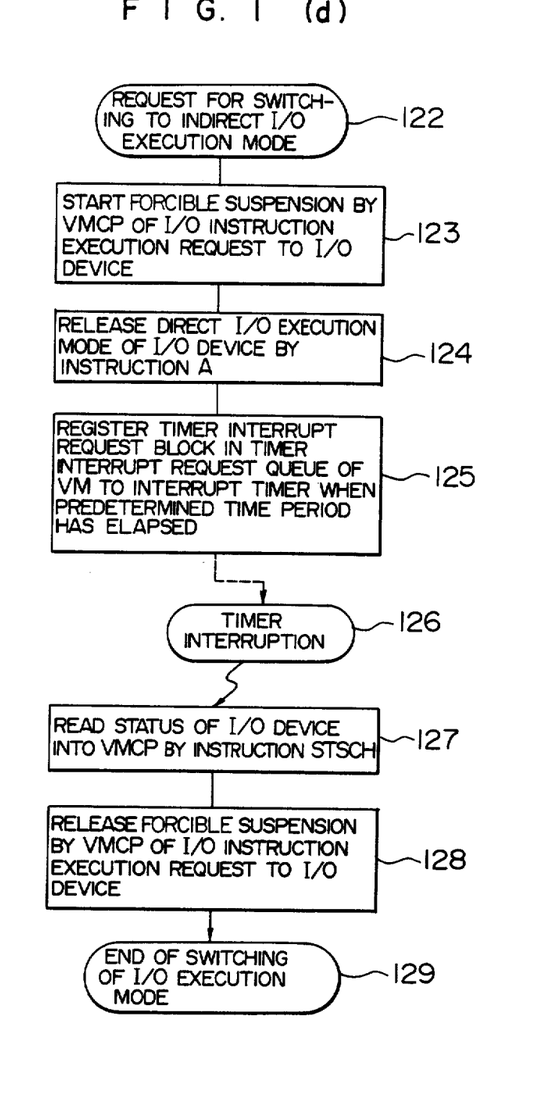

FIG. 1(d) shows other flow chart for switching the mode of the I/O device from the direct I/O execution mode to the indirect I/O execution mode.

When the switching to the indirect I/O execution mode is requested (step 122), the forcible suspension by the VMCP of the I/O instruction execution request to the I/O device is started (step 123). Then, the direct I/O execution mode of the I/O device is released by the instruction A (see FIG. 9). After a predetermined time period, a timer interrupt block is registered in a timer interrupt request queue of the VMCP to interrupt a timer (step 125). When the timer interruption is requested (step 126), a status of the I/O device is read into the VMCP by the instruction STSCH (step 127). Then, the forcible suspension by the VMCP of the I/O instruction execution request to the I/O device is released (step 128). Thus, the switching of the mode of the I/O device from the direct I/O execution mode to the indirect I/O execution mode is terminated (step 129).

Figure 2:
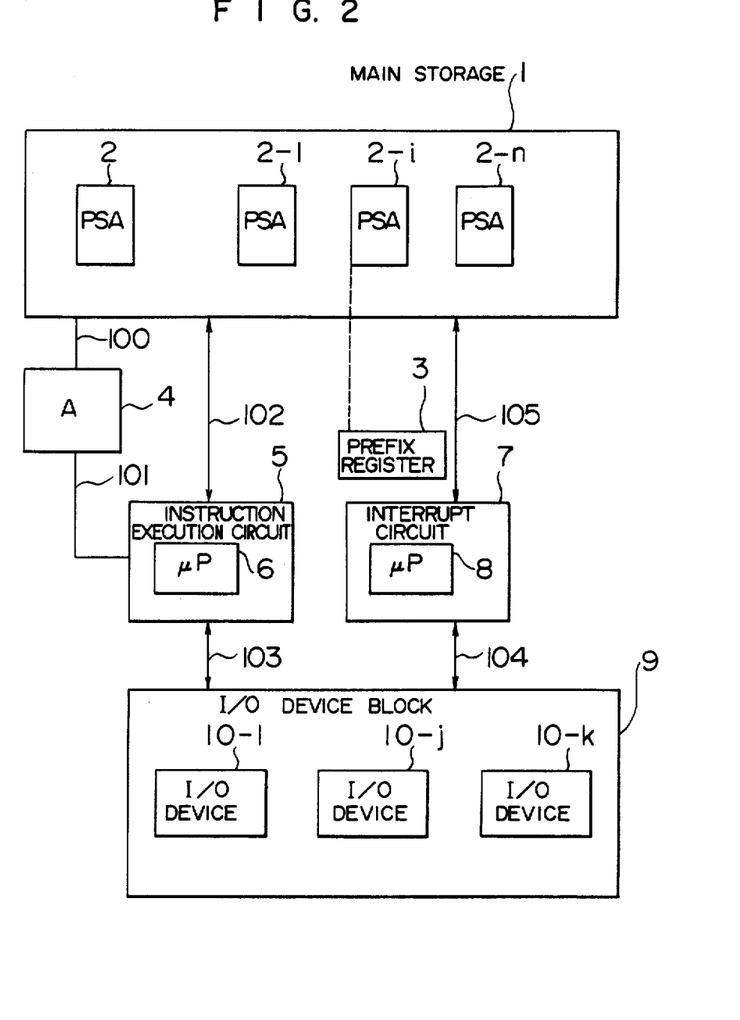
FIG. 2 shows a configuration of a virtual machine system to which the present invention is applied.

FIG. 2 shows a configuration of a virtual machine system in accordance with the present invention.

In FIG. 2, numeral 1 denotes a main storage, numeral 2 denotes a prefix save area (PSA) in which the VMCP stores the hardware status, numerals 2-i, ..., 2-i, ..., 2-n denote PSA's of the virtual machines VMi ($i=1 \sim n$), numeral 3 denotes a prefix register which contains an address of the PSA 2-i ($i=1 \sim n$) of the VMi while it runs, and contains an address of the PSA 2 of the VMCP after the control has been shifted to the VMCP, numeral 4 denotes an instruction register numeral 5 denotes an instruction execution circuit, numeral 6 denotes an instruction execution microprogram in the instruction execution circuit 5, numeral 7 denotes an interrupt circuit, numeral 8 denotes an interrupt microprogram in the interrupt circuit 7, numeral 9 denotes an I/O device block, and numerals 10-1, ..., 10-j, ..., 10-k denote I/O devices.

Figure 3:
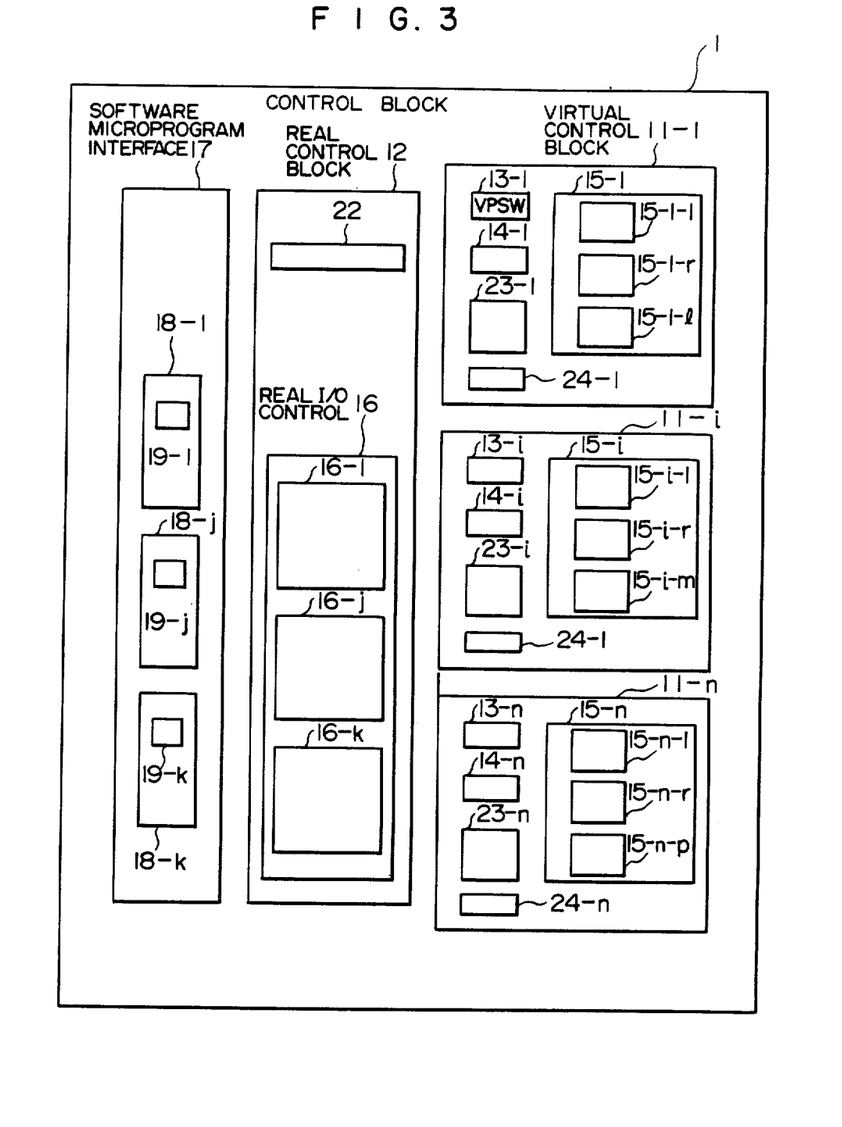
FIG. 3 is a detailed control block diagram of FIG. 2.

FIG. 3 shows a control block diagram of the main storage 1 which the VMCP uses to control the I/O operations.

In FIG. 3, numerals 11-1, ..., 11-i, ..., 11-n denote virtual control blocks which indicate status of virtual resources of the VMi ($i=1 \sim n$), and numeral 12 denotes a real control block which indicates status of resources which the VMCP recognizes. Each virtual control block 11-i ($i=1 \sim n$) comprises a VPSW 13-i ($i=1 \sim n$) for storing a program status word (PSW) of the VMi ($i=1 \sim n$), a virtual control register 14-i ($i=1 \sim n$) for storing a control register which controls I/O interrupt of the VMi ($i=1 \sim n$) by a submask, and a virtual I/O control block 15-i ($i=1 \sim n$) for describing the status of the I/O device block of the VMi ($i=1 \sim n$). The virtual control I/O device control block 15-i-r ($i=1 \sim n$) describes the status of the I/O devices of the VMi. Numeral 16 denotes a real I/O control block which controls I/O operations of the overall real I/O devices, and a real I/O device control block 16-j ($j=1 \sim k$) in the real I/O control block 16 indicates the status of the I/O device 10-j ($j=1 \sim k$) which the VMCP recognizes. Numeral 17 denotes a software-microprogram interface having a hardware system area on the main storage 1 which cannot be accessed or written by a software and can be accessed or written only by a microprogram. An I/O device field 18-j ($j=1 \sim k$) in the software-microprogram interface 17 indicates the status of the I/O device 10-j ($j=1 \sim k$). Numerals 19-1, ..., 19-j, ..., 19-k denote I/O device VM fields used to control the I/O operations of the VM.

Figure 4:
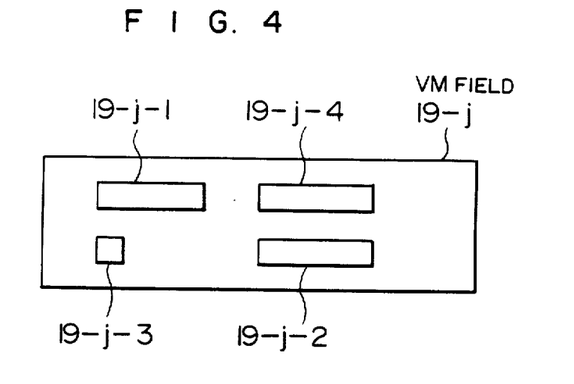
FIG. 4 shows a detail of an I/O device VM field of FIG. 3.

FIG. 4 shows a detail of the I/O device VM field 19-j of FIG. 3, where $j=1 \sim k$.

The I/O device VM field 19-j comprises a VM number field 19-j-1, a real subclass number field 19-j-2, a direct I/O execution mode bit 19-j-3, and an architecture number field 19-j-4. The VM number field 19-j-1 identifies the VM which contemplates to execute the I/O operations directly to the I/O device, and it is effective only when the direct I/O execution mode bit 19-j-3 is "1". The real subclass number field 19-j-2 contains the I/O interrupt subclass number which controls the I/O interruption of the I/O device 10-j. When the content of the real subclass number field 19-j-2 is q, the I/O interruption of the I/O device 10-j is controlled by Mq which is the content of the bit q of the control register 14 shown in FIG. 7, which will be explained later. When the direct I/O execution mode bit 19-j-3 is "1", it indicates that the I/O device 10-j is in the direct I/O execution mode, and when it is "0", it indicates that the I/O device 10-j is not in the direct I/O execution mode.

In the I/O device which is in the indirect I/O execution mode or in the direct I/O execution mode, the I/O instruction from the OS and the I/O interruption from the I/O device are processed in the following manner.

If an OSi requests an I/O instruction execution to the I/O device 10-j which is in the indirect I/O execution mode, a signal is sent to the instruction register 4 through a signal line 100 of FIG. 2, and the instruction register 4 sends a start signal for the instruction to the instruction execution circuit 5 through a signal line 101. The instruction execution circuit 5 and the instruction execution microprogram 6 examines the direct I/O execution mode bit 19-j-3 of the I/O device field 18-j for the I/O device 10-j through the signal line 102. Since the direct I/O execution mode bit 19-j-3 is now "0", the address of the PSA 2 of the VMCP is set in the prefix register 3 and the control is shifted to the I/O instruction control program of the VMCP. The I/O instruction control program of the VMCP simulates the I/O instruction in accordance with the information of the virtual I/O control block 15-i.

Figure 5:
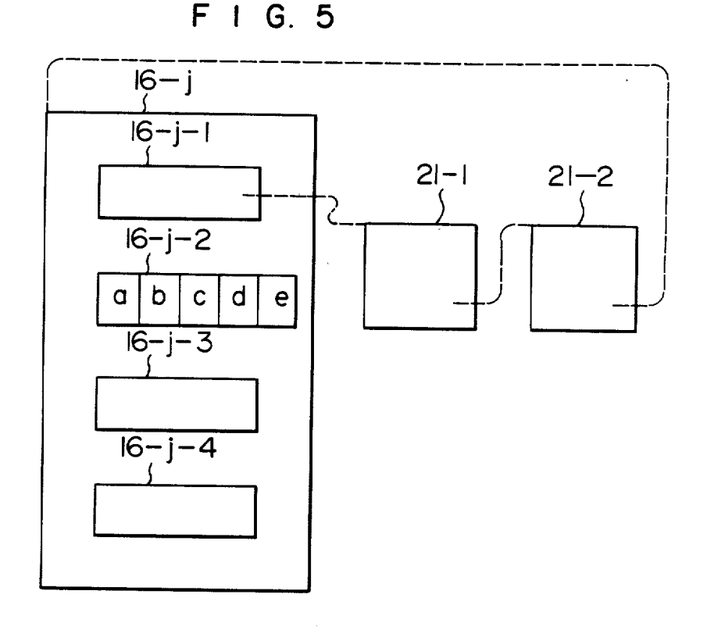
FIG. 5 is a detailed control block diagram of a real I/O device of FIG. 3.

In the simulation by the VMCP, the I/O instruction may or may not be issued to the I/O device 10-j depending on the information of the virtual I/O control block 15-i and the type of instruction. When the I/O instruction is to be issued, information necessary to execute the I/O instruction and the VM identification information are queued as an I/O instruction execution request in the real I/O device control block 16-j for the real I/O control block 16. FIG. 5 shows a detail of the real I/O device control block 16-j. The real I/O device control block 16-j comprises an I/O execution request pointer 16-j-1, a real status field 16-j-2, an I/O execution pointer 16-j-3 and an dedicating VM identification field 16-j-4. The I/O execution request pointer 16-j-1 contains an address of the area to which the I/O instruction execution for the I/O device 10-j is requested. In FIG. 5, two I/O instruction execution requests 21-1 and 21-2 have been queued. When there is no I/O instruction execution request, a start address of the real I/O device control block 16-j is stored in the I/O execution request pointer 16-j-1. If the I/O execution request pointer 16-j-1 and the start address of the real I/O device control block 16-j are equal, it means that the I/O execution request has not been queued in the real I/O device control block 16-j. When the I/O instruction for the I/O instruction execution request queued in the I/O instruction execution request queue is to be issued, the request is taken out of the I/O instruction execution request queue and the start address of the request is stored in the I/O execution pointer 16-j-3. The bit a of the real status field 16-j-2 is set to "1" to indicate that the I/O device is busy.

When the VMCP issues an I/O instruction separately from the simulation of the I/O instruction of the OS, information necessary to execute the I/O instruction and information for identifying the I/O instruction execution request of the VMCP are set as the I/O instruction execution request, which is queued in the real I/O device control block 16-j. When the I/O instruction which is inherent to the VMCP is to be executed, the bits a and b of the real status field 16-j-2 are set to "1". The bits a and b are reset to "0" when an I/O termination interruption occurs.

Figure 6:
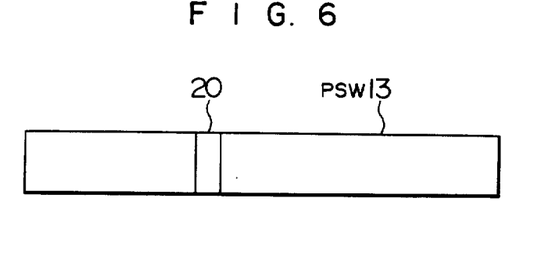
FIG. 6 shows a program status word (PSW).
Figure 7:
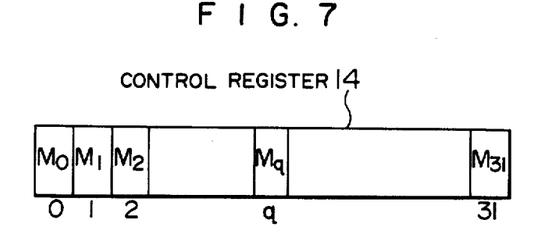
FIG. 7 shows a control register.

On the other hand, the simulation by the VMCP of the I/O interruption from the I/O device 10-j is performed in the following manner. FIG. 6 shows a format of the program status word (PSW) and FIG. 7 shows a construction of the control register. The I/O interruption is controlled by a bit I 20 of the PSW 13 shown in FIG. 6 and the control register 14 having a submask to control the I/O interruption, shown in FIG. 7. Only when the bit I 20 of the PSW 13 is "1" and the bit of the control register 14 which controls the I/O interruption designated by the I/O device VM field 19-j for the I/O device 10-j is "1", the I/O interruption is issued from the I/O device 10-j and the I/O interrupt signal is sent to the interrupt circuit 7 through a signal line 104. The interrupt circuit 7 and the interrupt microprogram 8 examine the content of the direct I/O execution mode bit 19-j-3 of the I/O device field 18-j of the I/O device 10-j through a signal line 105. Since it is now "0", the address of the PSA 2 of the VMCP is stored in the prefix register 3. Then, the I/O interruption is issued and the control is shifted to the I/O interrupt control program of the VMCP.

Figure 8:
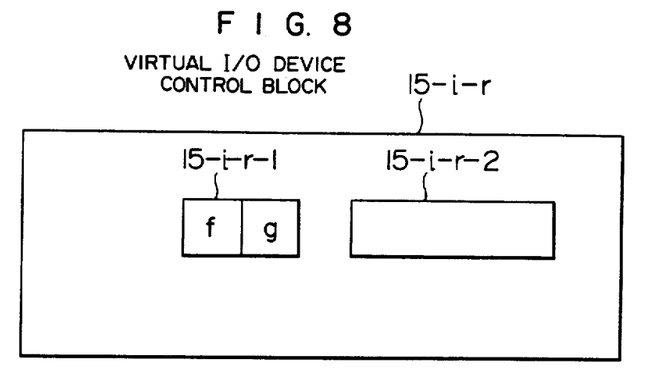
FIG. 8 shows a control block diagram of a virtual I/O.

The I/O interrupt control program of the VMCP stores the I/O interrupt information in the virtual I/O device control block 15-i-r for the virtual control block (VBLOKS)11-i of the VM based on the VM identification information in the I/O instruction execution request pointed by the I/O execution pointer 16-j-3. The I/O interrupt information to be reflected to an OSi varies depending on an architecture of the OSi. Thus, the VMCP converts the I/O interrupt information stored in the PSA 2 of the VMCP and the I/O interrupt information in the I/O device field 18-j to I/O interrupt information in the OSi architecture, and stores the I/O interrupt information to the virtual I/O device control block 15-i-r and indicates that the VMCP suspends the I/O interruption to the I/O device. FIG. 8 shows a detail of the virtual I/O device control block 15-i-r, which comprises a virtual status field 15-i-r-1 and a subclass indication field 15-i-r-2. A bit g of the virtual status field 15-i-r-1 is set to "1" to indicate that the I/O interrupt is being suspended.

When a bit I of the VPSW 13-i which is the virtual PSW of the OSi and the interrupt subclass for the virtual I/O device control block 15-i-r of the virtual control register 14-i are both "1", the VMCP reflects the I/O interruption to the PSA 2-i of the OSi and resets the bit g of the virtual status field 15-i-r-1 of the virtual I/O device control block 15-i-r to "0".

When the OSi issues the I/O instruction execution request to the I/O device 10-j which is in the direct I/O execution mode, a signal is sent to the instruction register 4 through the signal line 100. The instruction register 4 sends a start signal for the instruction to the instruction execution circuit 5 through the signal line 101. The instruction execution circuit 5 and the instruction execution microprogram 6 examines the direct I/O execution mode bit 19-j-3 of the I/O device field 16-j for the I/O device 10-j through the signal line 102. Since the direct I/O execution mode bit 19-j-3 is now "1", the I/O instruction from the OSi through the signal line 103 is directly executed.

When the I/O interruption of the I/O device 10-j which is in the direct I/O execution mode is present in the hardware and the bit I 20 of the PSW 13 is "1" and the bit of the control register 14 designated by the real subclass field 19-j-2 of the I/O device VM field 19-j for the I/O device 19-j is "1", the I/O interruption is issued. The interrupt circuit 7 and the interrupt microprogram 8 examines the direct I/O execution mode bit 19-j-3 of the I/O device field 18-j of the I/O device 10-j through the signal line 105. Since it is now "1", the I/O interruption is issued and the interrupt information is stored in the PSA 2-i of the VM. The interrupt information reflected to the PSA of the VM varies depending on the OSi architecture. The I/O device field 18-j contains the information to identify the architecture of the OSi which dedicates the I/O device 10-j, and the interrupt circuit 7 and the interrupt microprogram 8 stores the I/O interrupt information in the OSi architecture into the PSA 2-i of the VMi.

Figure 9:
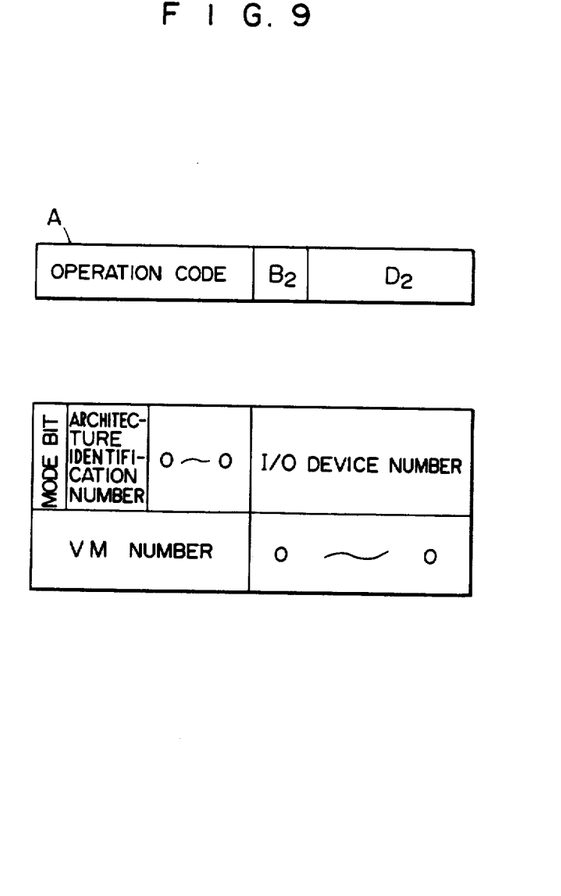
FIG. 9 shows an instruction in the present invention.

The instruction A to change the direct I/O execution mode bit 19-j-3 which indicates the direct I/O execution mode of the I/O device 10-j is now explained. FIG. 9 shows a format of the instruction A.

As seen from FIG. 9, the instruction A is a so-called S-instruction. A second operand address ($D_2B_2$) contains an address of a field which contains the I/O device number for designating the I/O device 10-j to which the instruction is executed, the VM number for identifying the VM which directly use that I/O device, the architecture identification number for designating the architecture of that VM and the mode bit for indicating the direct I/O execution mode or the indirect I/O execution mode to the I/O device.

When the instruction A is issued, a signal is sent to the instruction register 4 through the signal line 100 and a start signal for the instruction A is sent through the signal line 101. The instruction execution circuit 5 and the instruction execution microprogram 6 stores the VM number designated by the second operand address ($D_2B_2$) of the general purpose register, the mode bit and the architecture identification number into the VM number field 19-j-1, direct I/O execution mode bit 19-j-3 and architecture number field 19-j-4, respectively, through the signal line 102.

The switching of the mode of the I/O device from the indirect I/O execution mode to the direct I/O execution mode by the VMCP is carried out in the following manner. In order to identify the I/O device which request the mode switching, a bit f of the virtual status field 15-i-r-1 (see FIG. 8) in the virtual I/O device control block 15-i-r for the I/O device 10-j is set to "1".

When the I/O device 10-j corresponding to the virtual I/O device control block 15-i-r having "1" set at the bit f of the virtual status field 15-i-r-1 meets all of the following five conditions and the I/O device 10-j is not yet dedicated by the VMi which directly uses the I/O device, the VMCP sets a bit e of the real status field 16-j-2 to "1" and sets the VMi identification information into the dedicating VM identification field. If the VMi does not dedicate the subclass designated by the real subclass number field 19-j-2 of the I/O device VM field 19-j, the VMi dedicates it. The dedication of the subclass will be explained later. The mode of the I/O device 10-j can be switched to the direct I/O execution mode by the instruction A.

When the VMi is to be run thereafter, the bit of the control register 14 having the interrupt subclass corresponding to the I/O device in the direct I/O execution mode dedicated by the VMi is matched to the content of the virtual control register 14-i of the corresponding VMi. The content of the bit I 20 of the PSW 13 is also matched to the bit I of the VPSW 13-i.

In order to switch to the direct I/O execution mode, the following five conditions must be met.

(i) The VMCP does not have the I/O instruction execution queue in the real I/O device control block 16-j corresponding to the I/O device 10-j when the control has been shifted to the OSi on the VMi.

(ii) The virtual I/O device control block 15-i-r of the VMi corresponding to the I/O device which is to be switched to the direct I/O execution mode has no I/O interrupt suspension.

(iii) The VMCP and the VM's other than VMi are not executing the I/O operations to the I/O device which is to be switched to the direct I/O execution mode and they are not suspended for the I/O interruption.

(iv) The VMi dedicates or can dedicate the I/O interrupt subclass which controls the I/O interruption relating to the I/O device which is to be switched to the direct I/O execution mode.

(v) The VMi dedicates or can dedicate the I/O device which is to be switched to the direct I/O execution mode.

The necessity of those five conditions and a method for judging them are now described.

(i) If an I/O instruction execution is requested by other than VMCP or VMi after the I/O device 10-j has been switched to the direct I/O execution mode, the VMi may issue an I/O instruction which affects to the queued I/O operation requested by the VMCP or the VM other than the VMi to disturb the I/O operation control of the VMCP or other VM.

If the VMi issues an instruction which affects to the I/O instruction request queued in the real I/O device control block 16-j when the I/O instruction execution request of the VMi exists, that instruction is directly executed and cannot affect to the I/O instruction request. As a result, the I/O control of the VMi may be disturbed.

In the judgement by the VMCP, the start address of the real I/O device control block 16-j for the corresponding I/O device is compared with the content of the I/O execution request pointer 16-j-1. If they are equal, the VMCP does not have the I/O instruction execution request in the corresponding I/O device control block 16-j.

(ii) Let us assume that the I/O device is switched to the direct I/O execution mode while the suspension for the I/O interruption of the VMi is in the corresponding virtual I/O device control block 15-i-r. If the OSi issues an I/O instruction to the corresponding I/O device 10-j, the instruction execution circuit 5, instruction execution microprogram 6 and the I/O device block 9 would have to perform the same operation as that which is done when an I/O instruction is issued to the I/O device which suspends the I/O interruption. However, since the I/O interruption from the hardware has already been issued, the instruction execution circuit 5, instruction execution microprogram 6 and I/O device block 9 perform the operations which should have not been performed, and the I/O control of the OSi may be disturbed. In the judgement by the VMCP, if the bit f and the bit g of the virtual status field 15-i-r-1 are "1" and "0", respectively, there is no suspension of the I/O interruption by the VMCP.

(iii) Let us assume that the I/O device 10-j is switched to the direct I/O execution mode while the VMCP or other VM is executing the I/O operation or the I/O interruption is being suspended. If the OSi issues an I/O instruction to the I/O device 10-j, the I/O operation may be stopped or the suspended I/O interruption may be released depending on the type of instruction. As a result, the I/O control of the VMCP or other VM may be disturbed.

In the judgement by the VMCP, if the bit b of the real status field 16-j-2 of the corresponding real I/O device control block 16-j is "1", the VMCP is executing the I/O operation or the I/O interruption is being suspended. If the bit a of the real status field 16-j-2 is "1", whether the other VM is executing the I/O operation or the I/O interruption is being suspended or not is determined by the VM identification information is the I/O execution request pointed by the I/O execution pointer 16-j-3.

If the OSi is executing the I/O operation to the I/O device 10-j or if the I/O interruption is being suspended, the mode can be switched. The bit a of the real status field 16-j-2 in the real I/O device control block 16-j is reset to "0", and the area of the I/O instruction execution request having the address thereof stored in the I/O execution pointer 16-j-3 is cleared.

(iv) In order to directly execute the I/O interruption, the VMi must permit the I/O interruption, that is, the interruption is permitted only when the bit I of the VPSW 13-i is "1" and the bit of the control register 14-i corresponding to the I/O device is "1". Since the I/O operation is carried out asynchronously with the CPU, the bit of the corresponding subclass must follow the bit I of the VPSW 13-i and the corresponding bit of the control register 14-i or the I/O interruption must be inhibited even during the non-run of the VMi. Accordingly, it is necessary for the VMi to dedicate in the direct I/O execution mode the I/O interrupt subclass relating to the I/O device which is to be switched to the direct I/O execution mode. Accordingly, the VMi must dedicate or be able to dedicate the corresponding subclass.

The judgement by the VMCP is as follows. A dedicated subclass field 22 and dedicated subclass fields 24-i for the respective VMi are provided on the main storage 1. A subclass number conversion table 24-i includes virtual subclass numbers which the OSi recognizes and real subclasses which the hardware recognizes. In order for the VMi to dedicate a real subclass Mq, it is necessary and sufficient that there is no virtual subclass corresponding to Mq in the subclass number conversion table 23-i of other VM. When the real subclass is dedicated, the corresponding bits of the dedicated subclass field 22 and the dedicated subclass field 24-i of the VMi are set to "1".

In order for the VMi to switch the I/O device 10-j to the direct I/O execution mode, it is necessary that the dedicated subclass field 24-i of the VMi determines that the real subclass indicated by the subclass indication field 15-i-r-2 is dedicated, or there is not virtual subclass corresponding to said real subclass number in the subclass conversion table 23-i of other VM and said subclass can be dedicated.

The subclass indication field 15-i-r-2 contains the virtual subclass number and the real subclass number. The real subclass number is obtained by converting the virtual subclass by the subclass number conversion table 23-i. During the execution of the I/O operation by the VMi, the real subclass number of the subclass indication field 15-i-r-2 is set in the real subclass number field 19-j-2 of the corresponding I/O device field 18-j to control the I/O interruption.

(v) After the I/O device has been switched to the direct I/O execution mode, the whole I/O control of the I/O device is shifted to the OSi on the VMi and the VMCP has no I/O control information. Accordingly, other VM cannot issue the I/O instruction to that I/O device.

When the bit e of the real status field 16-j-2 is "1", it means that the I/O device 10-j is dedicated by the VM designated by the dedicating VM identification field 16-j-4. When the I/O device 10-j is to be dedicated by the VMi, the VMCP sets the bit e of the real status field 16-j-2 to "1" and sets information inherent to the VMi for indicating the dedication by the VMi into the dedicating VM identification field 16-j-4.

In the judgement by the VMCP, if the VMi dedicates the I/O device 10-j, the bit e of the real status field 16-j-2 is set to "1" and the information inherent to the VMi indicating the dedication by the VMi is set in the dedicating VM identification field 16-j-4. If the following three conditions are met, the VMi can dedicate the I/O device 10-j.

(i) The I/O device 10-j is not dedicated by other VM.

(ii) The real I/O device control block 16-j does not have the I/O instruction request of other VM.

(iii) No other VM is executing in the I/O device 10-j and no I/O interruption is being suspended.

The above three conditions must be met to allow the dedication in order to prevent disturbance in the I/O control of the other VM which is also brought in the switching to the direct I/O execution mode.

Three methods for switching the mode of the I/O device from the direct I/O execution mode to the indirect I/O execution mode are explained below.

In a first method, when the switching to the indirect I/O execution mode is requested, the instruction STSCH is issued to the I/O device 10-j to examine the status of the I/O device.

The instruction execution circuit 5 and the instruction execution microprogram 6 store the status of the I/O device stored in the I/O device field 18-j of the software-microprogram interface 17 into an area on the main storage 1 which can be referenced by the program, through the signal line 102. The VMCP sets the I/O control information of the VMCP based on the status of the I/O device obtained by the instruction STSCH. For example, if the I/O device 10-j is executing the I/O operation or is suspending the I/O interruption, the bit a of the real status field 16-j-2 in the real I/O device control block 16-j in the real control block (RBLOKS) 12 is set to "1". An I/O execution request is prepared and a start address of the request is set into the I/O execution pointer 16-j-3. In this manner, the VMCP is supplied with the information by which the VMCP assumes as if the mode had been the indirect I/O execution mode, and the direct I/O execution mode flag 19-j-3 of the I/O device field 18-j is reset to "0" by the instruction A. Thus, the I/O device 10-j is switched to the indirect I/O execution mode.

In a second method, when the switching from the direct I/O execution mode to the indirect I/O execution mode is requested, the bit c of the real status field 16-j-2 of the real I/O device control block 16-j of the I/O device to be switched to the indirect I/O execution mode is set to "1". The direct I/O execution mode flag 19-j-3 of the I/O device field 18-j is reset to "0" by the instruction A, and the bit d of the real status field 16-j-2 in the real I/O device control block 16-j is set to "1". If the bit d is "1", the I/O execution requests of the OS and VMCP are queued in the real I/O device control block 16-j and no I/O instruction is issued. During this period, the VMCP executes the I/O interruption for the I/O device 10-j. Upon the I/O interruption, the VMCP issues the instruction STSCH to check whether all I/O operations for the I/O device have been completed or not. If all have been completed, the bit d of the real status field 16-j-2 is reset to "0" in order to start the service to the I/O execution request queued in the real I/O device control block 16-j. The subsequent I/O control to the I/O device is carried out by the intervention of the VMCP.

In a third method; when the switching from the direct I/O execution mode to the indirect I/O execution mode is requested, the bits c and d of the real status field 16-j-2 in the real I/O device control block 16-j are set to "1". The direct I/O execution mode flag 19-j-3 of the I/O device field 18-j is reset to "0" by the instruction A. A timer interrupt request block is registered in the timer interrupt request queue which the conventional VMCP has in order to switch the I/O device to the indirect I/O execution mode a predetermined time later. The timer interrupt request block contains a time at which a timer interruption is requested and an address of a program of the VMCP to which the control is shifted after the interruption. Until the time interruption is requested, the VMCP executes the I/O interruption for the I/O device 10-j.

When the timer interruption is requested after the predetermined time period, the VMCP issues the instruction STSCH to the I/O device whose bit c of the real status field 16-j-2 is "1". It sets the I/O control information of the VMCP based on the status of the I/O device obtained by the instruction STSCH. This is the same process as that described in the first method. In this manner, the VMCP is supplied with information by which the VMCP assumes as if the mode had been the indirect I/O execution mode. It also resets the bit d of the real status field 16-j-2 to start the service to the I/O instruction execution request queued in the real I/O control block 16-j. The subsequent I/O control to the I/O device is carried out by the intervention of the VMCP.

In the present embodiment, the setting of the I/O device of the direct I/O execution mode and the release thereof can be done while the VM runs without stopping the VM or reloading the OS. The VMCP can issue the I/O instruction to the I/O device which is in the direct I/O execution mode, in the following manner. When the VMCP requests to issue the I/O instruction to the I/O device which is in the direct I/O execution mode, the I/O device is switched to the indirect I/O execution mode. After switching, the I/O instruction of the VMCP is executed and a request to switch the I/O device to the direct I/O execution mode is issued. Thus, the direct I/O execution mode is restored when the I/O environment of the I/O device dedicated by the VM is settled after the execution of the I/O instruction of the VM.

In accordance with the present invention, the direct I/O execution mode in which the I/O instruction to the I/O device dedicated by the VM and the I/O interruption relating to that instruction are executed directly by the hardware without intervention of the VMCP, and the indirect I/O execution mode in which the VMCP simulates can be switched during the run of the VM, and the efficient I/O control is attained.

We claim:

1. In a virtual machine system for running a plurality of operating systems on one machine under control of a virtual machine control program (VMCP), said system including a plurality of input/output devices and a circuit for processing instructions for starting said input/output devices and for processing input/output interrupts, wherein (i) when a first instruction requiring a start of a first input/output device among said plurality of input/output devices dedicated to one running operating system and having an interruption level dedicated to said one running operating system is issued during a time when said first input/output device is in a direct input/output execution mode, said circuit starts said first input/output device to execute an input/output operation indicated by the first instruction without interrupting said VMCP, (ii) when an input/output interrupt is provided thereafter from said first input/output device, said circuit processes said input/output interrupt without interrupting said VMCP, (iii) when said first instruction is issued from said one running operation system during a time when said first input/output device is in a simulation mode or when a second instruction requiring a start of a second input/output device other than said first input/output device is issued from another running operation system, said circuit provides said VMCP with an instruction interrupt to request execution of simulation of said first or second instruction, (iv) when an input/output interrupt is issued thereafter from said first or second input/output device, said circuit is provided an input/output interrupt to said VMCP to request execution of simulation of said input/output interrupt, and (v) said VMCP executes the simulation of said first or second instruction or the simulation of an input/output interrupt in response to said instruction interrupt or said input/output interrupt provided by said circuit; a method of input/output control for changing mode of operation of said first input/output device from a simulation mode to a direct input/output execution mode, comprising the steps of:

(a) detecting a status of execution of simulation be said VMCP regarding said first input/output device and a status of execution of an input/output start instruction regarding said first input/output device as issued from said VMCP; and (b) determining whether said status of execution of said simulation and said status of execution of said input/out start instruction satisfy a predetermined mode change condition so as to indicate said direct input/output execution mode to said circuit as a mode of operation of said first input/output device when a result of the determination is affirmative.

2. A method of input/output control according to claim 1, wherein said predetermined mode change condition indicates that said status of execution of simulation shows that neither simulation of an input/output start instruction issued from said one operating system for said first input/output device, nor simulation of an input/output interrupt provided by said circuit, is under execution by said VMCP, and that said status of execution of an input/output start instruction shows that said VMCP is not in a status in which said VMCP issued an input/output start instruction for a purpose other than simulation and that said VMCP has not yet received an input/output interrupt indicating completion of an input/output operation required by said issued input/output start instruction.

3. A method of input/output control according to claim 2, wherein said operation performed in step (b) comprises writing a signal indicating a direct input/output execution mode into a predetermined memory area accessible by said circuit within a main storage of said virtual machine system so as to indicate said direct input/output execution mode of said first input/output device to said circuit.

4. In a virtual machine system for running a plurality of operating systems on one machine under control of a virtual machine control program (VMCP), said system including a plurality of input/output devices and a circuit for processing instructions for starting said input/output device and for processing input/output interrupts, wherein (i) when a first instruction requiring a start of a first input/output devices among said plurality of input/output devices dedicated to one running operating system and having an interruption level dedicated to said one running operating system is issued during a time when said first input/output device is in a direct input/output execution mode, said circuit starts said first input/output device to execute an input/output operation indicated by the first instruction without interrupting said VMCP, (ii) when an input/output interrupt is provided thereafter from said first input/output device, said circuit processes said input/output interrupt without interrupting said VMCP, (iii) when said first instruction is issued from said one running operating system during a time when said first input/output device is in a simulation mode or when a second instruction requiring a start of a second input/output device other than said first input/output device is issued from another running operating system, said circuit provides said VMCP with an instruction interrupt to request execution of simulation of said first or second instruction, (iv) when an input/output interrupt is issued thereafter from said first or second input/output device, said circuit provides an input/output interrupt to said VMCP to request execution of simulation of said input/output interruption, and (v) said VMCP executes the simulation of said first or second instruction or the simulation of an input/output interrupt in response to said instruction interrupt or said input/output interrupt provided by said circuit; a method of input/output control for changing mode of operation of said first input/output device from direct input/output execution mode to simulation mode, comprising the steps of:

(a) detecting a status of execution of said first input/output device after indicating a simulation mode of said first input/output device to said circuit; and (b) after said step (a), and in response to an instruction interrupt regarding said first input/output device issued from said circuit, executing simulation of an input/output device start instruction issued from an operating system designated by an instruction interrupt independence on a result of said detecting step.

5. A method of input/output control according to claim 4, said step (a) further including writing a signal indicating a direct input/output execution mode into a predetermined memory area accessible by said circuit among memory areas of a main storage of said virtual machine system so as to indicate said direct input/output execution mode of said first input/output device to said circuit.

6. A method of input/output control according to claim 4, said step (a) further including reading information indicating a status of execution of said first input/output device written in a main memory of said virtual machine system by said circuit so as to detect said execution status of said first input/output device.

7. A method of input/output control according to claim 4, said step of executing simulation processing includes a step of issuing an input/output start instruction corresponding to said input/output start instruction issued from said one operating system when said step of detecting status of execution of said first input/output device reveals that said first input/output device is not under a specific execution status from a time of starting said input/output operation to a time that said circuit does not yet issue an input/output interrupt indicating completion of input/output operation.

8. A method of input/output control according to claim 7, said step of executing simulation processing includes a step of indicating that said first input/output device is busy to said one operating system when said step of detecting status of execution of said first input/output device reveals that said first input/output device is under said specific execution status.

9. A method of input/output control according to claim 7, when said step (a) indicates that said first input/output device is when said specific execution status further including the steps of:
  (c) delaying said instruction interrupt until said circuit issues said input/output interrupt indicating completion of input/output operation to said VMCP;
  (d) indicating that sad input/output interrupt indicating completion of input/output operation is being delayed to said one operating system having issued said input/output start instruction designated by said delayed instruction interrupt in response to an output of said input/output interrupt indicating completion of input/output operation; and
  (e) executing a simulation processing for said input/output interrupt indicating completion of input/output operation.

10. A method of input/output control according to claim 9, further including:
  (f) a step of measuring time elapsed from the time of indicating the simulation mode; and
  (g) a step of inhibiting said step (d) and indicating that said first input/output device is busy to said one operating system if said input/output interrupt indicating completion of said input/output operation is not indicated within a predetermined time.

* * * * *

UNITED STATES PATENT AND TRADEMARK OFFICE
CERTIFICATE OF CORRECTION

PATENT NO. : 4,887,202
DATED : Dec. 12, 1989
INVENTOR(S) : TANAKA et al.

It is certified that error appears in the above-identified patent and that said Letters Patent is hereby corrected as shown below:

Col. 15, claim 5, line 3, delete "direct input/output execution" and insert --simulation--;

line 6, delete "direct input/out-";

line 7, delete "put execution" and insert --simulation--.

Signed and Sealed this

Twenty-second Day of October, 1991

Attest:

HARRY F. MANBECK, JR.

*Attesting Officer*   *Commissioner of Patents and Trademarks*